(12) United States Patent
Madduri et al.

(10) Patent No.: US 10,351,770 B2
(45) Date of Patent: *Jul. 16, 2019

(54) COMPOSITIONS AND METHODS FOR THE STABILIZATION OF CLAY CONTAINING SOILS

(71) Applicant: HPPE LLC, Columbus, GA (US)

(72) Inventors: Ashoka V. R. Madduri, Belmont, MA (US); Matthew B. Blackmon, Columbus, GA (US); Sameer S. Vhora, Columbus, GA (US); Charles E. Milliron, III, Columbus, GA (US); Curtis J. Rodencal, Cresson, TX (US); Sanket Gandhi, Columbus, GA (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,259

(22) Filed: Aug. 3, 2018

(65) Prior Publication Data

US 2018/0340120 A1    Nov. 29, 2018

Related U.S. Application Data

(63) Continuation of application No. 15/001,479, filed on Jan. 20, 2016, now Pat. No. 10,072,208.
(Continued)

(51) Int. Cl.
  *E02D 3/12*    (2006.01)
  *C09K 17/32*   (2006.01)
(Continued)

(52) U.S. Cl.
  CPC .......... *C09K 17/32* (2013.01); *C08B 37/0021* (2013.01); *C08B 37/0051* (2013.01);
(Continued)

(58) Field of Classification Search
  CPC .................. E02D 3/12; E02D 2300/0098
(Continued)

(56) References Cited

U.S. PATENT DOCUMENTS 3,269,468 A * 8/1966 Phansalkar ............. E21B 21/16
                                                    175/71
4,289,850 A   9/1981 Robinson
(Continued)

FOREIGN PATENT DOCUMENTS

WO    2006/134322 A1   12/2006
WO    2013/068771 A1    5/2013
(Continued)

OTHER PUBLICATIONS

Indian Examination report received in corresponding Indian Application No. 201717039181 dated May 8, 2019.

*Primary Examiner* — Benjamin F Fiorello
*Assistant Examiner* — Edwin J Toledo-Duran
(74) *Attorney, Agent, or Firm* — Vorys, Sater, Seymour and Pease LLP

(57) ABSTRACT

Polysaccharides may be partially oxidized by oxidative opening of a monosaccharide unit while still retaining glycosidic bonds. Such polysaccharides may be further functionalized with an amine moiety at a site of oxidative opening. Polysaccharides that are partially oxidized and amine-functionalized in this manner may be combined with an aqueous liquid to form compositions suitable for stabilizing clays in clay-containing formations. Clay stabilization may promote reduced swelling of the clays in the presence of water.

17 Claims, 4 Drawing Sheets

Amino dextran (partially oxidized sugar dextran diethyl amine)

Related U.S. Application Data

(60) Provisional application No. 62/142,886, filed on Apr. 3, 2015.

(51) Int. Cl.
    *C08B 37/02*     (2006.01)
    *C08B 37/00*     (2006.01)
    *C09K 8/035*     (2006.01)
    *C09K 8/56*     (2006.01)
    *E02D 3/00*     (2006.01)

(52) U.S. Cl.
    CPC .......... *C08B 37/0096* (2013.01); *C09K 8/035* (2013.01); *C09K 8/56* (2013.01); *E02D 3/00* (2013.01); *E02D 3/12* (2013.01); *E02D 3/126* (2013.01); *C09K 2208/12* (2013.01)

(58) Field of Classification Search
    USPC .......................................... 405/263, 264, 265
    See application file for complete search history.

(56) References Cited

U.S. PATENT DOCUMENTS

| | | | | |
|---|---|---|---|---|
| 4,719,021 A * | 1/1988 | Branch, III | ............... | C09K 8/22 507/107 |
| 5,028,341 A * | 7/1991 | Liao | ............... | C09K 8/24 106/38.35 |
| 5,925,182 A * | 7/1999 | Patel | ............... | C08L 53/00 106/266 |
| 5,955,401 A * | 9/1999 | Liao | ............... | C09K 8/08 507/110 |
| 6,160,110 A * | 12/2000 | Thomaides | ............... | C08G 69/10 510/470 |
| 6,248,710 B1 * | 6/2001 | Bijsterbosch | ............... | C11D 3/222 510/470 |
| 6,258,756 B1 * | 7/2001 | Hayatdavoudi | ............... | C09K 8/206 175/65 |
| 6,818,596 B1 * | 11/2004 | Hayes | ............... | C09K 8/24 507/103 |
| 6,924,253 B2 * | 8/2005 | Palmer | ............... | C09K 8/528 166/312 |
| 7,566,686 B2 * | 7/2009 | Kippie | ............... | C09K 8/12 507/110 |
| 7,992,653 B2 * | 8/2011 | Zamora | ............... | C09K 8/38 166/309 |
| 2002/0155956 A1 * | 10/2002 | Chamberlain | ............... | C09K 8/12 507/100 |
| 2003/0106718 A1 * | 6/2003 | Patel | ............... | C09K 8/06 175/64 |
| 2007/0074315 A1 | 3/2007 | Collin | | |
| 2008/0039345 A1 | 2/2008 | Kippie et al. | | |
| 2008/0200354 A1 * | 8/2008 | Jones | ............... | C09K 8/524 507/244 |
| 2009/0008095 A1 * | 1/2009 | Duncum | ............... | C09K 8/032 166/292 |
| 2009/0281006 A1 * | 11/2009 | Walters | ............... | C09K 8/68 507/270 |
| 2011/0071058 A1 | 3/2011 | Howard et al. | | |
| 2012/0178653 A1 | 1/2012 | McClung, III | | |
| 2012/0118645 A1 | 5/2012 | Wilson, Jr. | | |
| 2013/0213659 A1 * | 8/2013 | Luyster | ............... | C09K 8/528 166/312 |
| 2014/0352969 A1 * | 12/2014 | Chung | ............... | C09K 8/588 166/308.3 |

FOREIGN PATENT DOCUMENTS

| | | |
|---|---|---|
| WO | 2013/160334 A1 | 10/2013 |
| WO | 2014/074443 A1 | 5/2014 |

\* cited by examiner

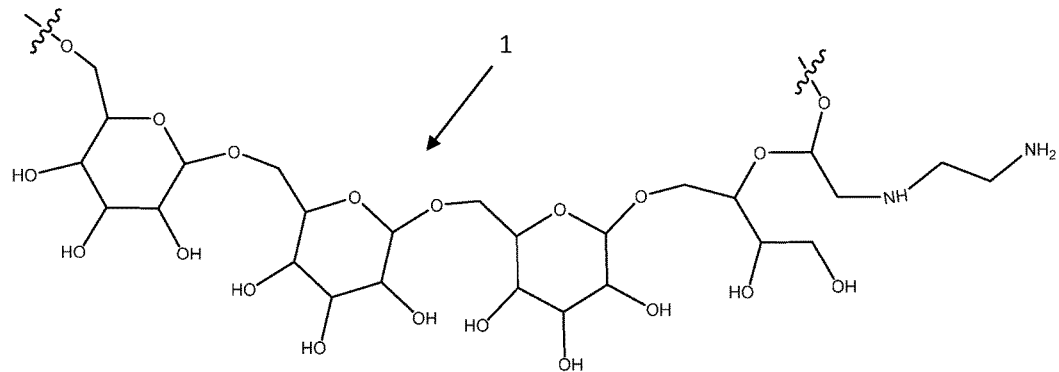
Figure 1A    Amino dextran (partially oxidized sugar dextran diethyl amine)
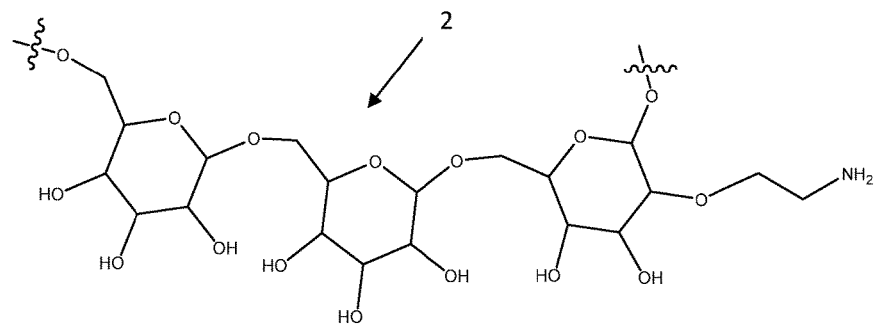
Figure 1B    Ethylamine dextran
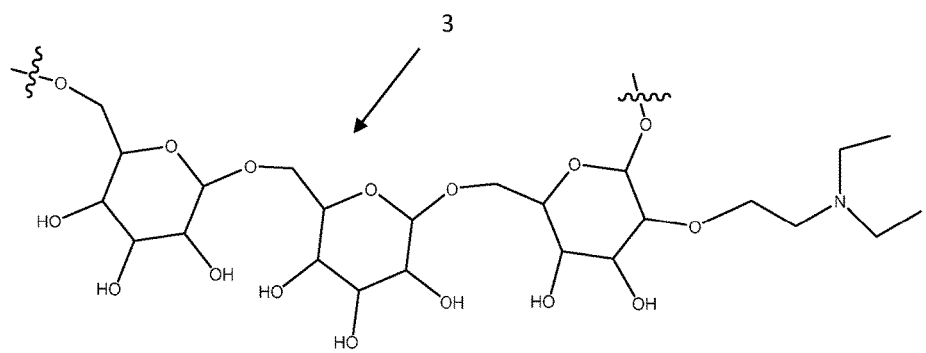
Figure 1C    Diethylethanolamine dextran

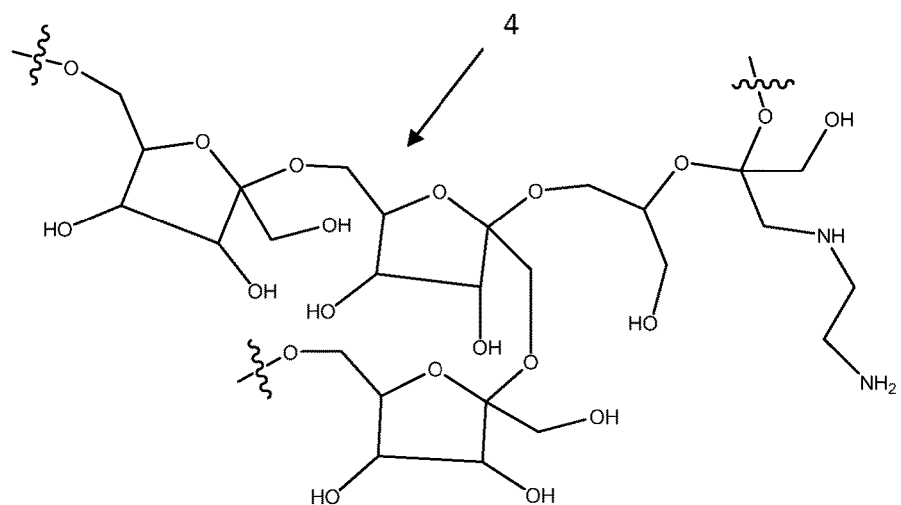
Figure 1D  Amino levan (partially oxidized sugar levan diethyl amine)
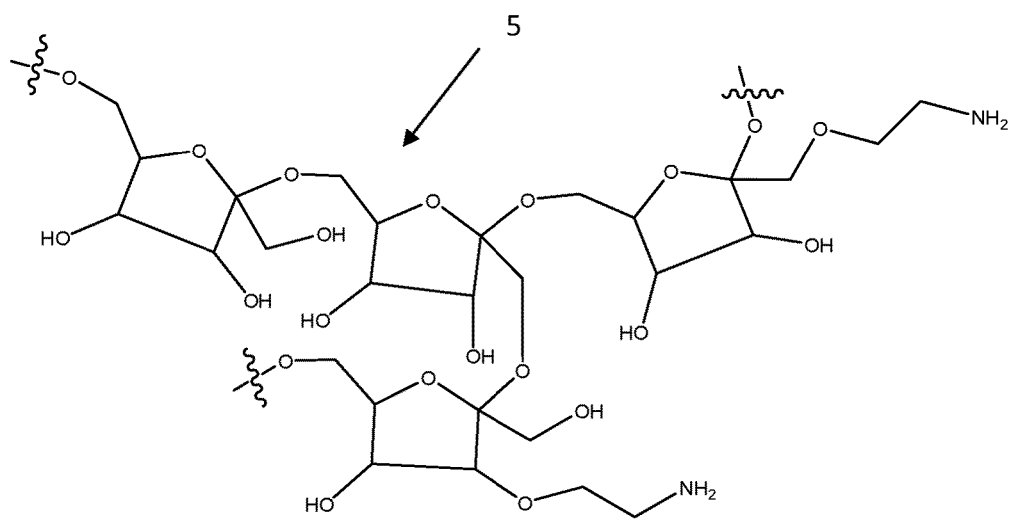
Figure 1E  Ethylamine levan

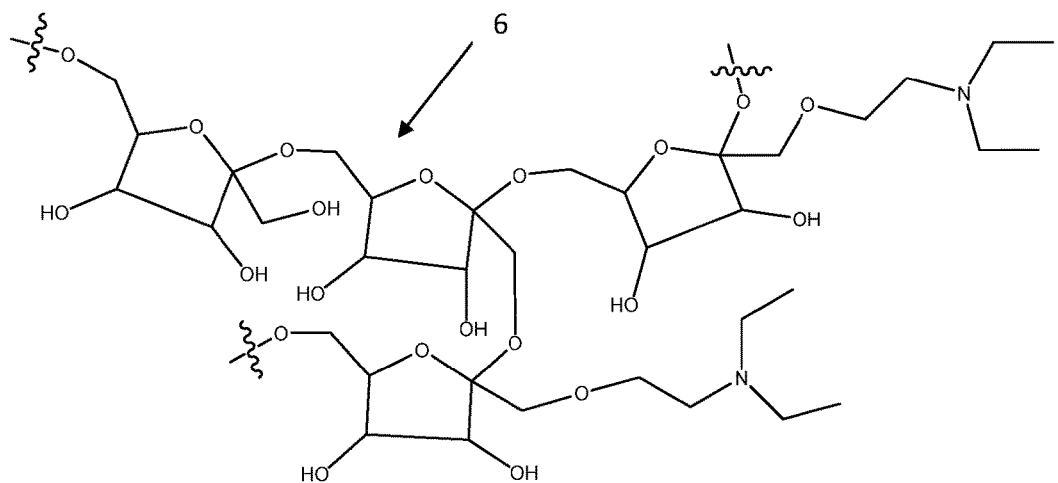
Figure 1F     Diethylethanolamine levan
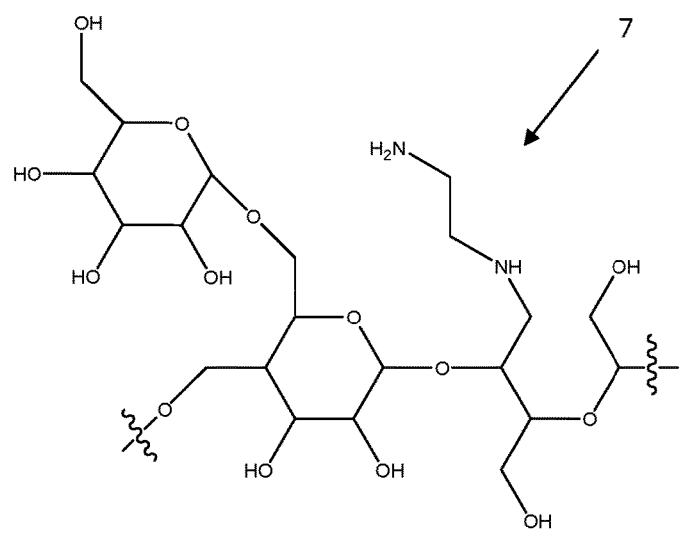
Figure 1G     Amino guar (partially oxidized sugar guar diethyl amine)

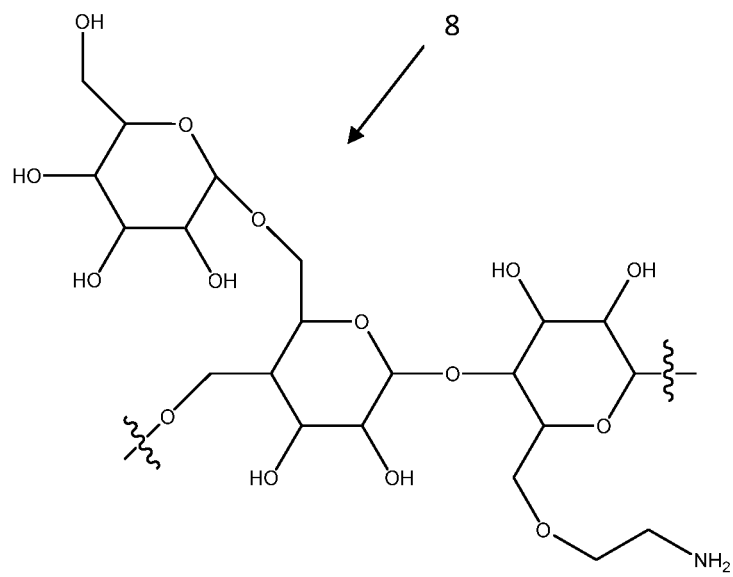
Figure 1H    Ethylamine guar
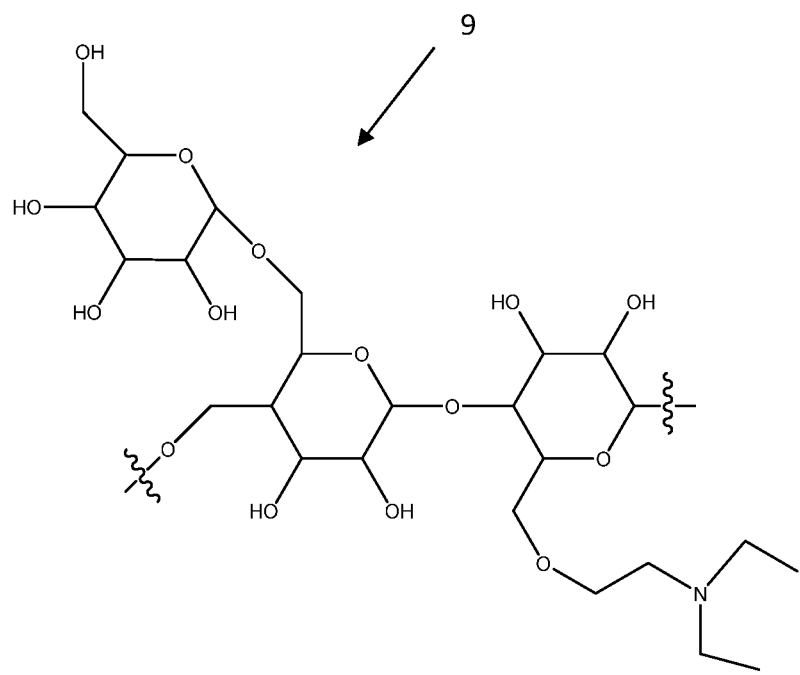
Figure 1I    Diethylethanolamine guar

COMPOSITIONS AND METHODS FOR THE STABILIZATION OF CLAY CONTAINING SOILS

CROSS-REFERENCE TO RELATED APPLICATIONS

The present application is a continuation of U.S. patent application Ser. No. 15/001,479, filed on Jan. 20, 2016, which claims the benefit of priority under 35 U.S.C. § 119 of U.S. Provisional Patent Application 62/142,886, filed on Apr. 3, 2015, each of which is incorporated herein by reference in its entirety.

STATEMENT REGARDING FEDERALLY SPONSORED RESEARCH OR DEVELOPMENT

Not applicable.

BACKGROUND

The present invention is directed to the production of polysaccharides and polysaccharide derivatives and, in particular, compositions, tools, systems and methods for the stabilization of clays, shales and other clay-containing materials and soils with polymers containing dextran, dextran derivatives, and other substituted polysaccharides.

Clay poses challenges, as it is well known for swelling in the presence of water. Within its crystalline layers, clay contains cations, typically sodium, which occupy base-exchange sites. Upon contact with water, these cations are solubilized resulting in clay instability and often swelling with complete breakdown of the solid into liquid slurry. When clay swells with the absorption of water, there is surface swelling and/or osmotic swelling due to absorption.

The ability of the clay-containing land to permit drilling, passage of liquids, or fracturing fluids as well as hydrocarbons, is diminished, impeding production. A number of clay stabilizers are available such as potassium chloride which functions in an ion exchange process. Potassium chloride reduces clay swelling by replacing a native clay cation with a potassium ion and/or creating an overall negative charge on individual clay layers. This charge is compensated for by cations located in the interlayer region, which can be freely exchanged. Accordingly, potassium saturated clays have a reduced tendency to swell and absorb liquids, thus increasing the excavation process and reducing excavation costs.

The cation exchange capacity of the mineral depends on crystal size, pH, and the particular type of cation involved. These may not only be small ions, but also poly-cations. Also, the potassium ion is over seventy percent larger than the sodium ion. Although potassium ions are effective at preventing swelling, high levels are required which contaminates the area. In addition, potassium chloride is hazardous and incompatible with other materials used, for example, in drilling and mining operations. Potassium negatively impacts fracturing fluids such guar, xanthan, welan, scleroglucan and polyacrylamide polymers, each of which is utilized in one or another excavation process.

Accordingly, there is a need in the art for a safe and effective clay stabilizer which is effective in all or substantially all of the clay constituents in a heterogeneous clay/shale formation.

SUMMARY

The present invention overcomes the problems and disadvantages associated with current strategies and designs and provides new tools, compositions and methods for stabilizing soils and other materials.

One embodiment of the invention is directed to soil stabilization processes comprising: providing a composition comprised of a polymer functionalized to contain one or more amine and/or alkyl moieties; mixing the composition with an aqueous liquid, such as for example, water or wellbore fluid, to form a stabilization solution; and applying the stabilization solution to a soil. Preferably the soil stabilization process is performed in association with a mining operation, an excavation operation, or a drilling operation and performed at greater than ambient, ambient or less than ambient temperatures, and the composition may be mixed with the soil. Preferably soil comprises one or more of minerals, dirt, organic material, inorganic material, shale, red mud, rock, mudrock, clay, slag, and tailings. Preferably the composition is a liquid at a pH of from about 5-8 and a viscosity of about 100-500 cP. Also preferably the functionalized polymer comprises a saccharide, a polysaccharide or a derivative thereof, such as, for example, dextran, guar gum, scleroglucan, welan, xanthan gum, chitosan, schizophyllan, levan, cellulose or a combination thereof. Wherein the polymer is a dextran, preferably the dextran has a molecular weight of about 3 kD to about 2,000 kD coupled to from 0-3 alkylamine moieties per monosaccharide unit and 20 percent or more of the monosaccharide units contain amine, alkyl and/or alkylamine moieties. Also preferably the polymer contains one or more amine moieties such as, for example, one or more amine, diamine and/or tetra-amine moieties, or one or more alkyl moieties such as, for example, aldehyde, alkane, alkene, alkyne, aryl or other hydrocarbon, or one or more alkyl/amine moieties. Preferably the composition contains no detectable sodium and also that the composition is not harmful to the environment. Preferably the composition further contains a surfactant, a defoaming agent, a detergent, a chelator, a buffer, an identifiable tag or a combination thereof. The process may further comprise monitoring the identifiable tag in the environment such as, for example, by tracking disbursement of the identifiable tag, tracking patterns of disbursement of the identifiable tag, tracking timing of degradation of the identifiable tag, and/or combinations thereof.

Another embodiment of the invention is directed to a soil stabilization process comprising: providing a composition containing a functionalized polysaccharide wherein multiple saccharide units of the functionalized polysaccharide are coupled to amine and/or alkyl moieties; forming a stabilization solution containing the composition; and applying the stabilization solution to a soil. Preferably the soil stabilization process is performed in association with a mining, an excavation, or a drilling operation and the stabilization solution prevents soil swelling when the soil comes into contact with an aqueous composition. Preferably the stabilization solution is flushed into a drilled space before, during or after drilling or other excavation. Also preferably the polysaccharide is dextran containing multiple alkyl, amine and/or alkyl/amine moieties wherein, for example, the alkyl moieties are selected from the group consisting of aldehyde, alkane, alkene, alkyne, aryl moieties, and combinations thereof, the amine moieties are selected from the group consisting of amine, diamine, tetra-amine moieties, and combinations thereof, or the alkylamine moieties are selected from the group consisting of combinations of hydrocarbon/amine moieties. Preferably the stabilization solution is not harmful to the environment and safe for handling without any requirements for specialized disposal (e.g., no risks as compared with hazardous disposal), and may further comprise mixing the composition with an aqueous liquid to form the stabilization solution. Preferably the polysaccharide comprises dextran, guar gum, scleroglucan, welan, xanthan gum, chitosan, schizophyllan, levan or cellulose, and contains multiple saccharide units wherein amine and/or alkyl moieties are coupled to at least 20 percent of the saccharide units, preferably 50 percent or more of the saccharide units. Preferably the composition further comprises a solvent such as, for example, a water-based or a polar solvent. Also preferably the stabilization solution further comprises an additive such as, for example, a surfactant, a defoaming agent, a detergent, a chelator, a buffer, an identification tag or a combination thereof. Preferably the stabilization solution further contains a drilling fluid and the drilling fluid is xanthan gum.

Another embodiment of the invention is directed a composition comprising a functionalized polymer, preferably of a polysaccharide, containing primary amine and/or alkyl group substitutions or moieties along the repeating units of the polymer chain. Preferably the polymer comprises one or more of dextran, guar gum, scleroglucan, welan, xanthan gum, chitosan, schizophyllan, levan, cellulose or combinations thereof. Also preferably, the polymer contains substitutions along 1-100 percent of its repeating units, the wherein the primary amine substitutions are preferably monoamines, diamines, tri-amines, tetra-amines moieties or combinations thereof, the alkyl group substitutions are methyl, ethyl, propyl, isopropyl, alkane, alkene, alkyne, aryl or hydrocarbon moieties, or combinations thereof, and alkyl moiety substitution comprise from 1 to 3 carbons. Preferably the composition further comprises a solvent such as, for example, a water-based or polar solvent. Also preferably, the composition further comprises an additive such as, for example, a surfactant, a defoaming agent, a detergent, a chelator, a buffer or a combination thereof. Also preferably, the composition of the invention is a stabilizing composition which is mixed with a fluid, for example but not limited to water, a drilling fluid, and an excavation fluid, and used to stabilize a soil being excavated for drilling or mining operations. Stabilization includes reduction and/or prevention of soil swelling. Preferred drilling fluids include, but are not limited to xanthan gums.

Another embodiment of the invention comprises methods of stabilizing soil comprising contacting the soil with the stabilizing compositions of the invention containing one or more functionalized polymers of the invention. Preferably the stabilizing composition comprises a functionalized polymer of the invention that is flushed into a space excavated before, during or after excavation, such as drilling or fracking. Preferably the composition prevents soil swelling when the soil comes into contact with a composition comprising water. Also preferably, the stabilizing composition is mixed with a drilling fluid.

Another embodiment of the invention comprises methods of stabilizing soil comprising contacting compositions of the invention at a work site such as, for example, a well, a mine or an excavation site. Preferably contacting comprises mixing a material and the functionalized polymer of the invention to form a thixotropic mixture, and depositing the thixotropic mixture at a work site. Preferred materials comprise soils such as clays, shales and the like.

Another embodiment of the invention comprises methods of stabilizing red mud which comprises contacting the red mud with the stabilizing composition of the invention containing one or more functionalized polymers. Preferably the red mud is a by-product of a mining process.

Other embodiments and advantages of the invention are set forth in part in the description, which follows, and in part, may be obvious from this description, or may be learned from the practice of the invention.

BRIEF DESCRIPTION OF THE DRAWINGS

FIG. 1A Structural depiction of amino dextran (partially oxidized sugar dextran diethyl amine).
FIG. 1B Structural depiction of ethylamine dextran.
FIG. 1C Structural depiction of diethylethanolamine dextran.
FIG. 1D Structural depiction of amino levan (partially oxidized sugar levan diethyl amine).
FIG. 1E Structural depiction of ethylamine levan.
FIG. 1F Structural depiction of diethylethanolamine levan.
FIG. 1G Structural depiction of amino guar (partially oxidized sugar guar diethyl amine).
FIG. 1H Structural depiction of ethylamine guar.
FIG. 1I Structural depiction of diethylethanolamine guar.

DETAILED DESCRIPTION

Drilling, mining and other excavating often requires the use of hazardous and high risk chemicals. For example, it is often necessary to stabilize a ground area in preparation for drilling or mining. Stabilization typically involves treating the soil with large amount of potassium chloride. The potassium ions displace native cations of the clay in the soil preventing swelling which would otherwise damage the drilling equipment. The concentrations of potassium chloride that are necessary to prevent swelling destroy plant life in the treated areas and eventually concentrate in run off and/or contaminate the aquifer. In addition, potassium chloride is useless in extremely cold climates because the potassium crystallizes out of solution becoming locked into crystals. These crystals do not allow for the displacement of other cations and, thus the addition of potassium chloride is unable to prevent soil swelling.

It was surprisingly discovered that polymers and, preferably functionalized forms of polysaccharides could be used to prevent soil swelling, especially the swelling of soils that are high in clay content, and also in red mud stabilization and disposal procedures. Functionalized polymers of the invention are useful to stabilize red mud created as a consequence of the Bayer process, which is used, for example, in the production of aluminum.

Polymers such as dextran and other polysaccharides are highly water-soluble molecules with structures that do not change under extremes of temperature and pH. Unlike potassium chloride, there are typically no or minimal issues associated with crystallization of the polymer when used at the low temperatures that exist when working in cold climates. Polymers such as polysaccharides and functionalized polysaccharides and derivatives thereof of the invention are environmentally safe, nonhazardous to work with and generally biocompatible. Dextran and other polysaccharide molecules are also biodegradable and pose little to no negative impact to plants, animals and other organisms or populations, or on the environment in general, even when used in high concentrations. Polysaccharides and polysaccharide derivatives of the invention that are useful as functionalized polymers of the invention simply and rapidly degrade in the environment into harmless components. Also, functionalized polysaccharide and functional polysaccharide derivatives (e.g., functionalized polymers containing conservative modifications, deletions and/or substitutions that remain functional) of the invention are preferably used as non-toxic, low viscosity liquids. As such, they are easily transportable, requiring no special handling as would hazardous materials, and thus readily available directly at the site of use. This ready-to-use availability eliminates time otherwise required for pre-mixing as well as disposal costs such as those associated with saltwater disposal.

Applicant has surprisingly discovered that polymers substituted with amines, alkyls, and/or alkyl amines are effective at reducing or preventing soil swelling such as of clay and other materials commonly associated in mining and drilling operations. Soils includes any materials to be excavated or drilled including, but not limited to minerals, dirt, organic material, inorganic material, shale, red mud, rock, mudrock, clay, slag, tailings and combinations thereof. Preferred functionalized polymers of the invention include polymers such as, for example but not limited to polysaccharide, dextran, guar gum, chitosan, scleroglucan, welan, xanthan gum, schizophyllan, levan and cellulose. Preferred functionalized polysaccharides include, for example, polysaccharides substituted or modified with alkyl groups or moieties such as, for example, aldehyde, alkane, alkene, alkyne, aryl, and other hydrocarbon. Examples of substituted polysaccharides of the invention include, polysaccharides substituted with amine (e.g., primary amine), diamine and tetra-amine groups, polysaccharides substituted with alkyl groups or moieties, and/or polysaccharides substituted with alkylamine moieties. Preferred examples include methyl, ethyl, propyl and isopropyl substituted polysaccharides and/or oxidized polysaccharides, monoaldehyde, dialdehyde, and/or polyaldehyde substituted polysaccharides and/or oxidized polysaccharides, and monoamine, diamine, triamine, and polyamine substituted polysaccharides and/or oxidized polysaccharides. Especially preferred examples include dextran (e.g., a branched polyglucan composed of many glucose molecules) in chains of varying lengths. Preferably the polymers are from about 2 kD to about 100,000 kD, more preferably from about 5 kD to about 50,00,000 kD, more preferably from about 100 kD to about 10,000 kD, and combinations thereof. Preferably polymers comprise from 1-3 alkyl/amine substitutions per polymer unit, preferably a monosaccharide or glucose unit. Substitutions can range from 1 to 100 percent of the monosaccharide units of the polysaccharide containing substitutions. The degree and amount of substitution and coupled moieties may depend on the particular moiety or moieties substituted, and may be determined empirically by those skilled in the art. Preferably units that contain moieties may comprise from 5 to 80 percent, preferably from 10 to 50 percent, preferably from 30 to 70 percent, or preferably from 10 to 50 percent. Also preferred are polysaccharides containing multiple different substitutions including but not limited to alkyl and amine moiety substitutions.

Clay Control Additive Handling, Mixing and Field Operation

One embodiment of the invention is directed to functionalized polymers of the invention used to control the swelling of sons such as, for example, sons containing days. These day-controlling polymers of the invention are preferably chemically engineered (functionalized and optionally modified by, for example, oxidation) to encapsulate minerals found in day sons and/or colloidal particles common in reservoirs (e.g., man-made reservoirs, unconventional reservoirs, work-site overflow pits, fluid holding pits, stimulation fluids). The day minerals encountered are preferably illite (e.g., detrital and diagenetic), smectite, mixed illite and smectite, kaolinite, chlorite, muscovite, biotite, talc, glauconite, sepiolite, saponite and combinations thereof. In addition, the functionalized polymers of the invention encapsulate various forms of colloidal oxides such as, for example, preferably hematite, goethite, ilmenite, colloidal silica, calcite, dolomite and combinations thereof.

Functionalized polymers of the invention are preferably mixed with, for example, fluids associated with drilling activities as fluid compositions. The preferred concentration of the functionalized polymer is from about one percent to about 75 percent, or from about 10 percent to about 50 percent, or from about 10 percent to about ninety percent, or from about 25 percent to about 75 percent, or any combination thereof. Preferred concentrations of the functionalized polymers of the invention in an associated fluid at a work site is generally within the preferred ranges and can be tailored to more exact amounts depending on the particular compound utilized. When desired, concentrations can be calculated based on molecular function and/or determined empirically. Functionalized polymers of the invention are preferably utilized for drill string curing (e.g., string pickling), well killing, matrix acidizing stimulation, well abandonment, well bore clean-up, open well bore conditioning, hydraulic fracturing (e.g., primary stimulation of unconventional shale and limestone reservoirs), inhibitor, chemical stabilization treatments and similar processes.

Functionalized polymers of the invention preferably function in aqueous (e.g. water-based formulations) (WBF) and hydrocarbon- or oil-based formulations (OBF) as fluids for example, in dispersed, non-dispersed and polymer based drilling, drill-in and stimulation fluids. The general stimulation fluids include: 1) "slick" water which comprises a range of one or more of make-up waters, clay control agents, surfactants and anti-corrosion additives; 2) hybrid systems that include, for example, friction reducers, clay control additives, anti-freezers (e.g., $CaCl_2$, KCl) surfactants, gel breakers, and anti-corrosion additives; 3) linear and cross linked gel fluids comprised of, for example, guar and xanthan gums, surfactants, clay control agents, anti-corrosion agents, viscosity enhancers (cross-linkers), viscosity reducers (breakers), carrier oils (diesel, synthetic olefin oils, and the like), and buffers (acids and bases). Each of these fluids are routinely utilized in the stimulation and drilling industry.

Functional polymers of the invention are preferably provided as a liquid, for example, to a well site either in one cubic meter vessels (referred to as "totes") or in bulk form (e.g., 1,000-5,000 gallon tanks). Hydraulic or electrical pumps transport the liquid to a centralized mixing tank or a fluid stock tank (e.g., as immediate or long-term storage). Tanks are used for mixing and blending of the full range of drilling fluids described herein. The mixing protocol can vary from one operation to the next with respect to the order of addition of the various agents, compounds and additives. Preferably the functionalized polymers of the invention are mixed centrally or in partial batches for final blending in tanks (e.g., from 500 to 20,000 gallons) either in compartments or in whole fluid chambers. Tanks may be fabricated to minimize corrosion (e.g., stainless steel, aluminum, PVC) or lined for additional strength and fluid management. Functionalized polymers of the invention are preferably mixed with a range of make-up waters such as, for example, 100 percent fresh water (potable or non-potable) from local water wells and resources, to blends of produced water from the well ranging from 1-50 percent produced water with fresh water, to a range of treated produced water as make-up water.

Mixing tanks typically feed high pressure pumps designed to deliver a range of fluid viscosities and densities to the subsurface as desired for the particular operation. Fluids are transported with standard pressurized suction lines and pumping units utilized in the industry. Functionalized polymers of the invention as liquids can be utilized with reciprocating pumps, the full range of positive displacement hydraulic pumps, high pressure non-cavitating pumps, and cavitating jet pumps, to name a few. Typical pumping pressures utilized for the particular operation which can be 1,000 psi or much more, such as for example, 1,000 to as much as 10,000 psi or even more, so are not limited to this range. These pumping units can be truck-mounted, skid mounted or fixed land-based units at the well site. Functionalized polymers of the invention containing fluids are then discharged through typical monitoring and control units (which are sometimes referred to as Christmas Trees) through pressurized discharge pipes and hoses used in the industry routinely. Fluids containing functionalized polymers of the invention are preferably pumped directly downhole (e.g., bullheaded) or can be pumped through specialized "spot" pumping equipment known as coiled tubing pressure pumping.

Functionalized polymers of the invention whether as dry compositions or as fluid compositions are straightforward to create and inexpensively manufactured in large quantities. Processes for manufacture include combining, for example, dextran at an acid or alkaline pH, with an amine chloride for a period of time sufficient to allow for completion of the chemical conversion (e.g., generally minutes to hours) at an elevated temperature (e.g., generally above ambient temperature and less than about 200° C., preferably from about 50-150° C., more preferably about 60° C.) and precipitating the substituted polymer with an alcohol. Obtaining a degree or percent of substitutions along the polymer is known or determined empirically by those skilled in the art. FIGS. 1A-1I list a number of functionalized polymers of the invention and provides both chemical structures 1-9 and common chemical names. Functionalized polymers of the invention include functional modifications and derivatives of the listed chemical structures 1-9 including salts thereof. Modifications and/or derivatives include compounds with more or less chemical moieties, substitution and/or side chains, but are otherwise functional according to the invention. Preferred functionalization includes, but is not limited to modification of a polysaccharide and/or a modified polysaccharide molecule (e.g., oxidized, acid or alkaline pH treated) with one or more diethylaminoethyl (DEAE), diethylethanolamine, diethylamine, ethylamine, ethanol amine, and amine moieties.

Functionalized polymers of the invention are preferably liquids, but may be manufactured as semi-solids such as gels and pastes, or solids such as, for example, powders or blocks, which are preferably solubilized in a liquid before use. As these functionalized polymers are preferably water soluble, the preferred solvent is water and other water-based or polar substances, but can be non-polar or hydrophobic depending on the particular compound and/or the presence of additional substances within the stabilization composition. Preferably the functionalized polymer compositions of the invention contain no or only small amounts of sodium and/or other single molecule cations (e.g. less than 1,000 ppm, preferably less than 100 ppm, more preferably less than 10 ppm or more preferably less than 1 ppm calcium, potassium and/or sodium). Also preferably the functionalized polymers and compositions of the invention contain no ingredients, components or additional chemicals at concentrations that are or that could be harmful to the user, to the environment and/or to any associated materials or equipment of the operation or even nearby equipment that is otherwise unrelated to the specific operation.

Preferably functionalized polymers of the invention are manufactured and distributed in a concentrated form and diluted before use. Concentrations vary depending upon the particular use to which the stabilization composition is applied and also the particular soil conditions (e.g., percent hydrated or dry). Preferred concentrations of the functionalized polymers include, for example, from 5-100 percent, from 10-90 percent, from 20-80 percent and from 30-70 percent when used with a solvent. Preferred concentrations for use in drilling and fracking procedures include, for example, from 0.01-10 percent, from 1-9 percent, from 2-8 percent and from 3-7 percent.

Additional substances that can be included with the functionalized polymer compositions of the invention include, for example, surfactants/defoaming agents, detergents, chelators, and/or buffers. Preferred surfactants/defoaming agents include silicone polymer, polysorbate, antifoam A, Tween, or any combination thereof. Preferred detergents include sodium dodecyl sulfate, lithium dodecyl sulfate, sodium taurodeoxycholate, sodium taurocholate, sodium glycocholate, sodium deoxycholate, sodium cholate, sodium alkylbenzene sulfonate, N-lauroyl sarcosine, or any combination thereof. Preferred chelators include ethylene glycol tetra acetic acid, hydroxyethylethylenediaminetriacetic acid, diethylene triamine penta acetic acid, N,N-bis (carboxymethyl)glycine, ethylenediaminetetraacetic, citrate anhydrous, sodium citrate, calcium citrate, ammonium citrate, ammonium bicitrate, citric acid, diammonium citrate, ferric ammonium citrate, lithium citrate, or any combination thereof. Preferred buffers include tris(hydroxymethyl) aminomethane, citrate, 2-(N-morpholino)ethanesulfonic acid, N,N-Bis(2-hydroxyethyl)-2-aminoethanesulfonic acid, 1,3-bis(tris(hydroxymethyl)methyl amino)propane, 4-(2-hydroxyethyl)-1-piperazine ethanesulfonic acid, 3-(N-morpholino) propanesulfonic acid, bicarbonate, phosphate, or any combination thereof. The pH of the compositions of the invention may be any pH at or between pH 1 and pH 14, and is preferably between about pH 4-9, more preferably about pH 5-8 and more preferably about pH 7. Concentrations of preferred additives of the invention are detergents at from about 0.001 percent to about 0.1 percent (wt./vol.); chelators at from about 0.01 µM to about 1 mM; and buffers at from about 10 µM to about 10 mM.

Also preferably, the functionalized polymers of the invention are effective over a wide temperature range and do not solidify at low temperatures, as compared to ambient. Preferable functionalized polymers and compositions of the invention remain liquid at temperatures at and below 10° C., at and below 5° C., at and below 0° C., at and below minus 5° C., and at and below minus 10° C. More preferably, the functionalized polymers and compositions of the invention are useful over a temperature range of minus 10° C. and greater. Higher temperatures are not necessarily an issue with stabilization, although functionalized polymers and compositions of the invention can be used at ambient temperatures, and temperatures at or greater than 25° C., 30° C., 35° C., 40° C., 45° C., 50° C. and even higher.

Embodiments of the invention may comprise functionalized polymers plus stabilizer and other compositions that include, for example, unique nucleic acid and/or amino acid sequences, unique chemical codes, unique particles, unique nanoparticles (e.g., single-walled, double-walled and multi-walled carbon nanotubes), or other identifiable tags can be detected and identified after use such as, for example, in products produced and/or the environment. Detection of unique and identifiable tags allow for tracking and monitoring of present and prior use of the functionalized polymers and compositions of the invention. Monitoring and tracking can be used for environmental purposes, agricultural purposes, assessing disbursement including patterns of disbursement and timing of degradation, and other purposes.

Another embodiment of the invention is directed to methods of stabilizing soils. Functionalized polymers (e.g. polymer compounds themselves) and/or compositions of the invention are contacted with soils before, during or after mining, drilling or another excavation procedure. By contacting inventive functionalized polymers and/or compositions before or during excavation, excavation can proceed smoothly and quickly without the need to periodically stop excavation for stabilization control. Continuous stabilization occurs simultaneously with excavation. Alternatively, and for example in drilling and fracking procedures, the ground is drilled and immediately thereafter, a fluid including the stabilizing functionalized polymers and/or compositions of the invention flushed into the drilled spaces. Alternatively, stabilization can be used periodically during excavation to stabilize a region of soil in advance of, during and/or soon after excavation, thus allowing excavation to proceed smoothly and created a stable space. Contact may comprise mixing the functionalized polymers and/or compositions of the invention with soil of the excavation area and/or other materials forming a thixotropic fluid. A preferred method comprises mixing the compounds and/or compositions of the invention with a drilling fluid, such as for example, pumping fluids, drilling mud, xanthan gum, and the like, and flushing the drilled space with the mixture. Preferably, 10 parts drilling fluid is mixed with one-part stabilizing functionalized polymers and/or compositions of the invention. The exact proportions may vary depending on the drilling fluid and stabilizing functionalized polymers chosen and can be empirically determined by one skilled in the art. Ratios of drilling fluid to functionalized polymer include the proportions 100:1, 50:1, 20:1, 10:1, 5:1, 2:1, 1:2, 1:5, 1:10, 1:20, 1:50, and 1:100, including those ratios in between these ranges. The resulting fluid can have a consistency from molasses to a paste such as, for example, a viscosity of from about 50-10,000 cP, preferably from about 100-500 cP, and more preferable from about 200-300 cP. Alternatively, functionalized polymers and/or compositions of the invention can be deposited directly onto soils such as an excavation site, in concentrated or diluted forms.

Another embodiment of the invention is directed to methods of stabilizing by-products of mining and excavations. Preferably, the by-products are soils that contain clay and other water-absorbing composition. Contact of the functionalized polymers and/or compositions of the invention with the by-products stabilizes the by-products, specifically preventing swelling. Stabilization prevents expansion of the by-products outside of a containment area and, for example, can prevent catastrophic break-down of containment.

Preferably, the stabilizer is a single fluid of the invention which can be used alone or in combination with other wellbore fluids and remains effective over broad range of pH values and temperatures.

The following examples illustrate embodiments of the invention, but should not be viewed as limiting the scope of the invention.

EXAMPLES

Example 1 HTMAC Dextran from Epoxide HP4596

HTMAC (hydroxypropyltrimethyl ammonium chloride) dextran directly from epoxide was obtained by reacting dextran with glycidyltrimethyl ammonium chloride in the presence of caustic and water at elevated temperatures (preferable from 50-100° C.).

Example 2 HTMAC Dextran from Hydroxy Chloride HP4019

First step in the synthesis of HTMAC (hydroxypropyltrimethyl ammonium chloride) dextran was obtained by obtaining epoxide from (3-Chloro-2-hydroxypropyl)trimethyl ammonium chloride in the presence of caustic and water at elevated temperatures (preferable from 50-100° C.). Formed epoxide (in situ) and dextran was reacted with caustic in water at elevated temperatures (preferable from 50-100° C.) yielded HTMAC Dextran.

Example 3 Amino Dextran (Partially Oxidized Sugar Dextran Diethyl Amine) HP3650

Amino dextran was obtained by reacting dextran with sodium periodate in water at room temperature (preferable from about 20-22° C.) followed by ethylene diamine addition in water at room temperature and final step followed by reduction of formed imine with sodium borohydride in water at room temperature.

Example 4 Diethylethanolamine Dextran HP7577

Diethylethanolamine dextran was obtained by reacting dextran with 2-chloro-N,N-diethylamine in the presence of caustic and water at elevated temperatures (preferable from 50-100° C.).

Example 5 Ethylamine Dextran HP3670

Ethylamine dextran was obtained by reacting dextran with 2-chloroethylamine in the presence of caustic and water at elevated temperatures (preferable from 50-100° C.).

Example 6 Amino Levan (Partially Oxidized Sugar Levan Diethyl Amine) HP3816

Amino levan was obtained by reacting levan with sodium periodate in water at room temperature followed by ethylene diamine addition in water at room temperature and final step followed by reduction of formed imine with sodium borohydride in water at room temperature.

Example 7 Amino Guar (Partially Oxidized Sugar Guar Diethyl Amine) HP3945

Amino guar was obtained by reacting guar with sodium periodate in water at room temperature followed by ethylene diamine addition in water at room temperature and final step followed by reduction of formed imine with sodium borohydride in water at room temperature.

Example 8 Capillary Suction Time (CST) Test

HP4019, HP7577, HP3650, HP4596, HP3670 and HP3816 solution clay stabilizer performance were evaluated by capillary suction time tests (OFITE capillary suction timer). All the solutions were prepared by dissolving appropriate amount of polysaccharide derivatives in tap water. The performances of these products were compared to the performance of standards (choline chloride, calcium chloride). HP4019, HP7577, HP3650, HP4596, HP3670, HP3816 and dextran solutions were prepared at various concentrations. The test fluids are prepared from each solution of HP4019, HP7577, HP3650, HP4596, HP3670 and HP3816 at 1 gpt (gallons per thousand) and 2 gpt concentrations. 1 g shale was added in 15 mL of each test fluid and test fluids were mixed for 10 to 15 minutes. CST ratios are calculated by dividing compound CST values with blank (distilled water) CST values and results are shown in Table 1. Smaller CST ratios indicate better performance of the clay stabilization products. HP3816, HP3650, HP4596 and HP3670 showed superior performance in comparison to the commercial choline chloride and calcium chloride products. Moreover pure un-functionalized dextran gave very high CST ratio indicates that amine functionalization is key for the clay stabilization

TABLE 1

Capillary suction time test results at 1 gpt and 2 gpt

| Concentration of Solids | HP4596 | HP3650 | HP3670 | HP4019 | HP7577 | HP3816 | Choline chloride 70% | CaCl$_2$ 15% | Dextran 10% |
|---|---|---|---|---|---|---|---|---|---|
| 1 gpt | 0.068 | 0.072 | 0.077 | 0.13 | 0.17 | 0.066 | 0.12 | 0.39 | 2.39 |
| 2 gpt | 0.092 | 0.067 | 0.067 | 0.13 | 0.13 | 0.064 | 0.11 | 0.26 | 3.34 |

Other embodiments and uses of the invention will be apparent to those skilled in the art from consideration of the specification and practice of the invention disclosed herein. All references cited herein, including all publications, and all U.S. and foreign patents and patent applications are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

What is claimed is the following:

1. A process comprising:
    providing a composition comprising an aqueous liquid and a partially oxidized polysaccharide in which glycosidic bonds are retained from a parent polysaccharide and partial oxidation comprises oxidative opening of a monosaccharide unit of the parent polysaccharide;
        wherein the partially oxidized polysaccharide comprises an amine moiety at a site of oxidative opening; and
    introducing the composition into a clay-containing formation;
        wherein the partially oxidized polysaccharide stabilizes a clay in the clay-containing formation.
2. The process of claim 1, wherein the composition is introduced into the clay-containing formation during a drilling operation.
3. The process of claim 1, wherein the composition is introduced into the clay-containing formation during a stimulation operation.
4. The process of claim 3, wherein the stimulation operation is a matrix acidizing operation or a hydraulic fracturing operation.
5. The process of claim 1, wherein the composition is introduced into the clay-containing formation during a clean-up operation.
6. The process of claim 1, wherein the partially oxidized polysaccharide comprises a partially oxidized dextran, a partially oxidized levan, or a partially oxidized guar.
7. The process of claim 1, wherein the parent polysaccharide comprises a plurality of monosaccharide units and about 5%-80% of the plurality of monosaccharide units are oxidatively opened and bear an amine moiety at the site of oxidative opening.
8. The process of claim 1, wherein the composition further comprises a surfactant, a defoaming agent, a detergent, a chelator, a buffer, an anti-corrosion additive, an anti-freezer, a gel breaker, an anti-corrosion additive, a breaker, a cross-linker, a gelling agent, a carrier oil, or any combination thereof.
9. The process of claim 1, wherein the partially oxidized polysaccharide prevents swelling of the clay.
10. The process of claim 1, wherein the amine is an alkylamine.
11. The process of claim 10, wherein the alkylamine is a diamine, a first amine group of the diamine being covalently bonded to the site of oxidative opening and a second amine group of the diamine being tethered via an alkyl group to the site of oxidative opening.
12. A composition comprising:
    a partially oxidized polysaccharide in which glycosidic bonds are retained from a parent polysaccharide and partial oxidation comprises oxidative opening of a monosaccharide unit of the parent polysaccharide;
        wherein the partially oxidized polysaccharide comprises a partially oxidized dextran, a partially oxidized levan, or a partially oxidized guar,
        wherein the partially oxidized polysaccharide comprises an amine moiety at a site of oxidative opening, and
        wherein the partially oxidized polysaccharide promotes stabilization of a clay in a clay-containing formation.
13. The composition of claim 12, further comprising:
    an aqueous liquid.
14. The composition of claim 12, further comprising:
    a surfactant, a defoaming agent, a detergent, a chelator, a buffer, an anti-corrosion additive, an anti-freezer, a gel breaker, an anti-corrosion additive, a breaker, a cross-linker, a gelling agent, a carrier oil, or any combination thereof.
15. The composition of claim 12, wherein the parent polysaccharide comprises a plurality of monosaccharide units and about 5%-80% of the plurality of monosaccharide units are oxidatively opened and bear an amine moiety at the site of oxidative opening.
16. The composition of claim 12, wherein the amine is an alkylamine.

17. The composition of claim 16, wherein the alkylamine is a diamine, a first amine group of the diamine being covalently bonded to the site of oxidative opening and a second amine group of the diamine being tethered via an alkyl group to the site of oxidative opening.

\* \* \* \* \*